INVENTORS
RAMSES R. MINA
WILLIAM W. PHARIS
BY Hoffman Stone
ATTORNEY

INVENTORS
RAMSES R. MINA
WILLIAM W. PHARIS
BY
Hoffman Stone
ATTORNEY

United States Patent Office 3,535,460 Patented Oct. 20, 1970

3,535,460

COOPERATIVE LINEFINDER ARRANGEMENTS FOR STEP-BY-STEP TELEPHONE EXCHANGES

Ramses R. Mina and William W. Pharis, Rochester, N.Y., assignors to Stromberg-Carlson Corporation, Rochester, N.Y., a corporation of Delaware Filed Sept. 20, 1967, Ser. No. 669,147
Int. Cl. H04q 3/24
U.S. Cl. 179—18 3 Claims

ABSTRACT OF THE DISCLOSURE

An alternate routing system for a step-by-step telephone exchange. Stepping switches and input terminals are arranged in groups numbering more than two, each stepping switch being associated with and limited to the input terminals in its own group. The outputs of selected ones of the stepping switches in each group are connected respectively to input terminals in all of the other groups. A relay tree controls the operation of the switches so that no more than two of them are used to connect an input terminal to any output terminal. A call is routed through a switch in the group where it originates if an output terminal is available there. If an output terminal is not available in the group where the call originates, but one is available in another group, the call is routed through one of the selected switches and appears in the other group as an incoming call.

BRIEF SUMMARY OF THE INVENTION

Certain claims in this application are generic to the invention disclosed and claimed in the co-pending application of Rames Mina and Gunter Neumeier, Ser. No. 602,296, filed Dec. 16, 1966, entitled "Multiple Circuit Route Capacity," and assigned to the present assignee.

This invention relates to novel switching arrangements, and, more particularly, to novel switching arrangements especially adapted for use in an automatic telephone exchange of the step-by-step type, to permit a reduction in the amount of equipment required to provide a given traffic capacity.

The system of the invention relates to the application of the principles of alternate routing to the connections between linefinders and first selectors in an automatic telephone exchange of the step-by-step type.

Heretofore, in step-by-step telephone exchanges, linefinders have usually been arranged in shelves, each constituting a linefinder subscriber group, serving typically one hundred lines, with all the linefinders of each shelf assigned to a corresponding number of first selectors. It has been necessary, heretofore, to provide as many first selectors as there are linefinders.

The principles of traffic analysis show that if the linefinders of several shelves had common access to a number of first selectors, the number of first selectors required to handle a given traffic load would be much smaller than the number required in the systems heretofore used.

Accordingly, an important object of the present invention is to reduce the amount of hardware required in an automatic telephone exchange of the step-by-step type for handling a given traffic load by applying the principles of multiple routing to certain switching arrangements in the exchange.

Briefly, in accordance with the invention, the linefinder shelves of an exchange are formed into cooperative divisions, typically of five to ten shelves each, to share a common group of first selectors. Selected linefinders of each shelf, usually a majority of them, are denoted the direct linefinders, and are connected directly to an equal number of first selectors. The remaining linefinders, denoted auxiliary linefinders have their outputs connected to the inputs of linefinders on other shelves of the cooperative division. When all of the primary linefinders of any shelf, and their associated first selectors are busy, an incoming call is directed through an auxiliary linefinder to a neighboring shelf, which has a free direct linefinder and associated first selector. The arrangement permits a substantial reduction in the number of first selectors needed to handle a given traffic load, because the traffic is averaged over all the lines served by the shelves of the cooperative division rather than the smaller number of lines served by a single shelf.

Illustrative embodiments of the invention will now be described in detail in connection with the accompanying drawings, wherein.

Figure 4:
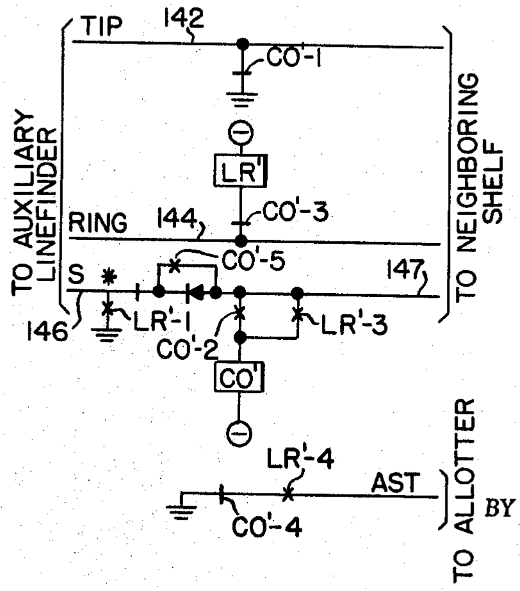
Figure 3:
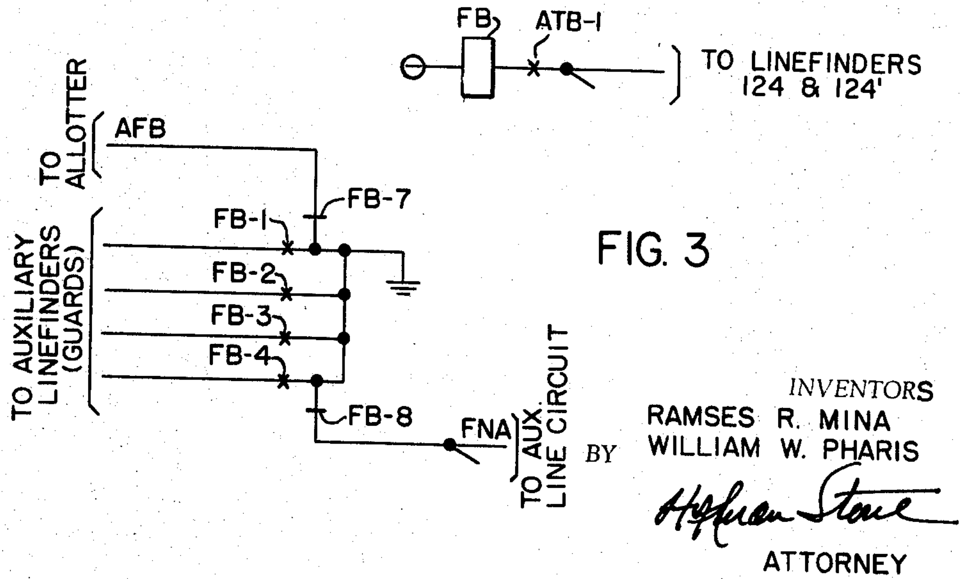

FIG. 3 is a schematic circuit diagram showing connections for a control relay arranged to direct calls normally to the direct linefinders and alternatively to the auxiliary linefinders when all the direct linefinders are busy; and, FIG. 4 is a schematic diagram of an auxiliary line circuit connecting the output of an auxiliary linefinder on one shelf to the input of a direct linefinder on a neighboring shelf for use where the auxiliary linefinder is connected to only one neighboring shelf.

Symbols conventionally used in the telephone industry have been used throughout the drawings. Circuit connections in some of the figures are indicated by single lines, although it will be understood that in practice, the trunks, for example, will be two-wire or four-wire lines. Also, matrices and circuit components that are arranged in multiple arrays are indicated only by representative units thereof, and certain minor, obvious components such as diodes have been omitted to avoid unduly complicating the drawing and obscuring the invention.

Figure 1:
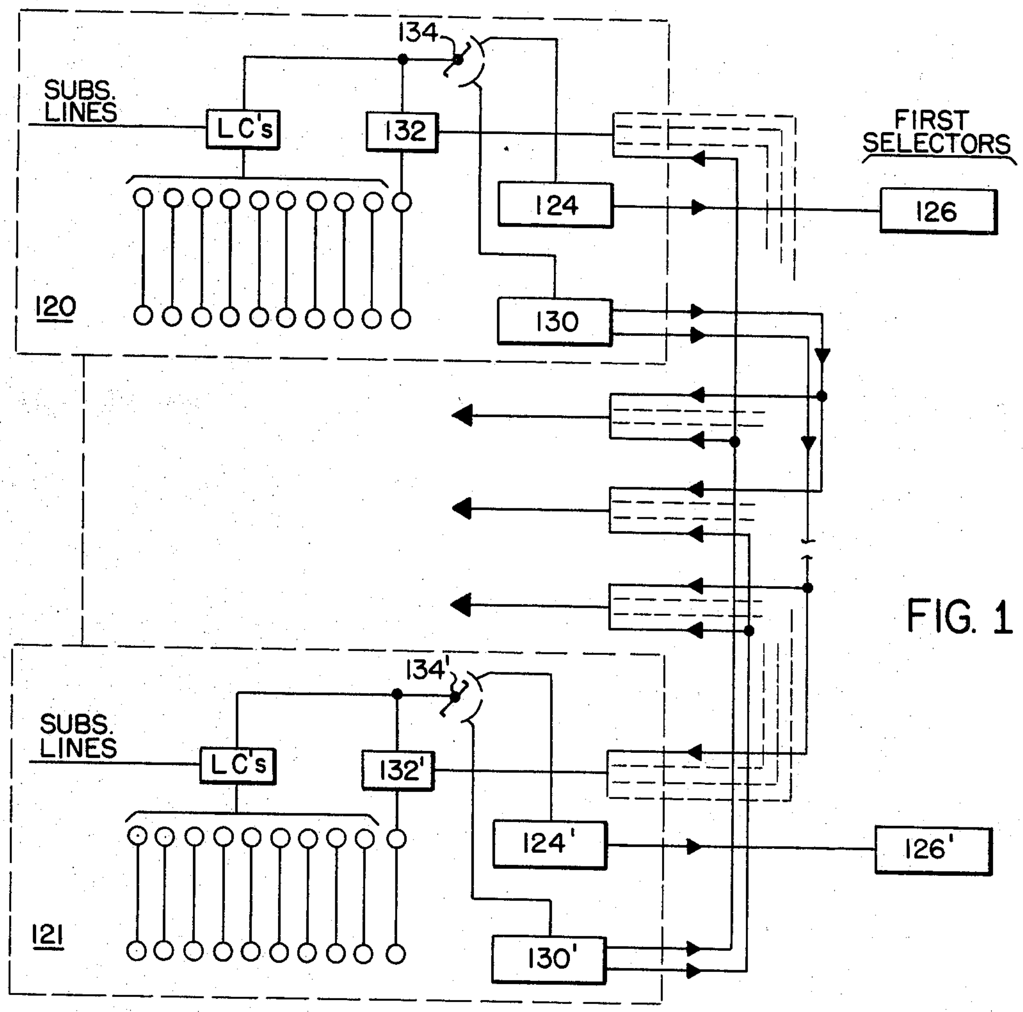
FIG. 1 is a schematic block diagram of a cooperative linefinder arrangement according to the invention.
Figure 2:
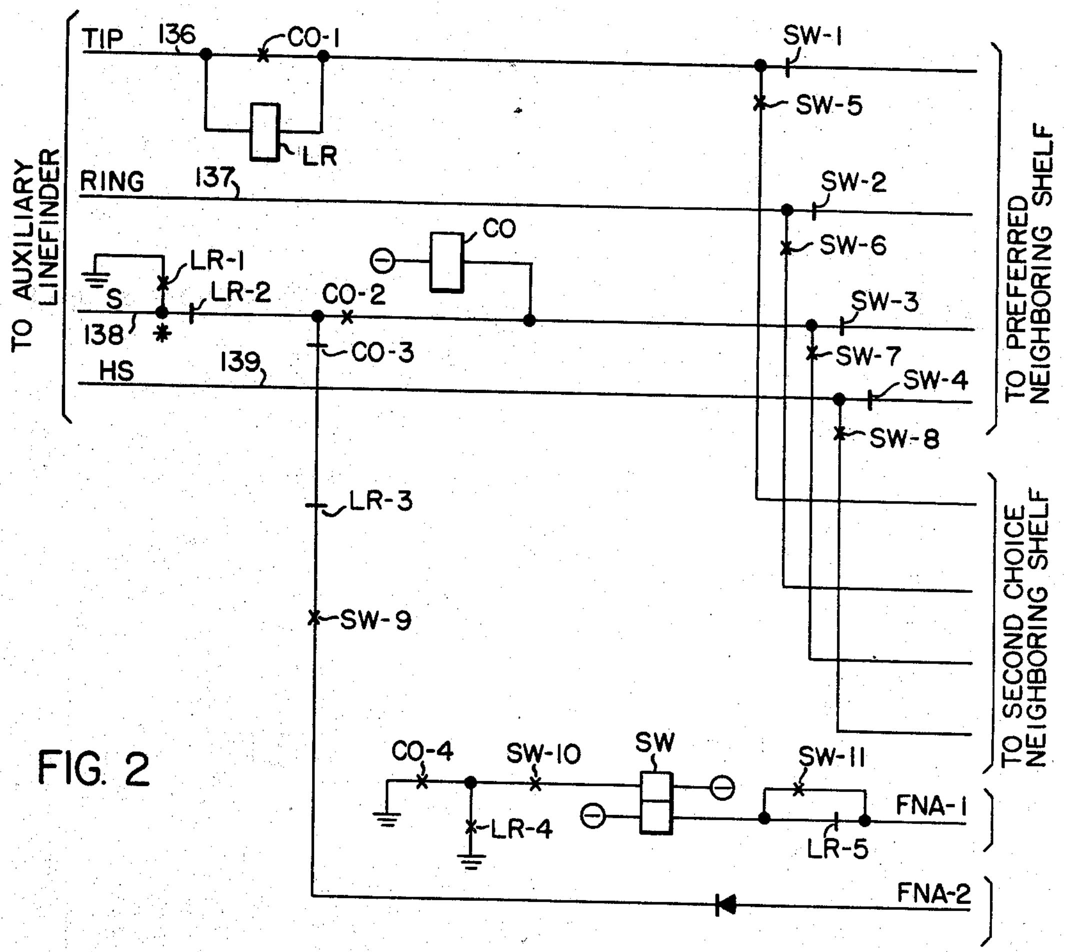
FIG. 2 is a schematic circuit diagram of an auxiliary line circuit showing the connection between an auxiliary linefinder on one shelf and linefinders on two other shelves.

Referring now to the cooperative linefinder arrangement of the invention as shown in FIGS. 1–3, linefinders in step-by-step systems are usually arranged in groups called shelves, each shelve being connected to serve a separate group of subscriber's lines, typically one hundred, and including, typically, some ten or twelve stepping switches connected to seek out lines calling for service, the number of such switches depending upon traffic requirements. In the embodiment shown, five linefinder shelves are indicated, two of them 120 and 121 being shown in block form. The five shelves are interconnected to constitute a cooperative division of the exchange.

In each shelf 120–121, a majority of the linefinders 124 and 124' are denoted direct linefinders, and are connected in the conventional way directly and separately to respective first selectors 126 and 126'. A smaller number of linefinders 130 and 130', typically four, on each shelf are denoted auxilary linefinders, and are connected to line circuits 132 and 132' on neighboring shelves. When the allotter 134 or 134' on any one shelf finds all of the direct linefinders 124 or 124' on its shelf busy, it steps to one of the auxiliary linefinders 130 or 130', and if an idle direct linefinder 124 or 124' is available on any of the other shelves of the division, the call is completed through it. Thus, each shelf may have access to all of the first selectors 126 and 126' serving the entire cooperative division.

The relay tree shown in FIGS. 2 and 3 constitutes an auxiliary line circuit arranged for selectively switching the output of one of the auxiliary linefinders 130 or 130' between two neighboring shelves, and for marking the auxiliary linefinder busy when all of the direct linefinders 124 and 124' on the neighboring shelves are busy. One of the neighboring shelves is denoted the preferred shelf and the other one is denoted second choice. The auxiliary line circuit operates to direct the output of the auxiliary linefinder to which it is connected to the preferred shelf so long as any of the direct linefinders 124 or 124' in the preferred shelf is idle. When all of the direct linefinders in the preferred shelf are busy, the output of the auxiliary linefinder 130 or 130' is switched to second choice shelf. In the event all of the direct linefinders 124 and 124' on both the preferred and the second choice shelves are busy, the circuit acts to mark the auxiliary linefinder 130 or 130' to which it is connected busy so that the allotter 134 or 134' will not direct the call to it, but will step to another auxiliary linefinder.

As shown in FIGS. 2 and 3, the output of each auxiliary linefinder 130 and 130' is connected by four leads 136, 137, 138, and 139, denoted respectively the tip, the ring, the sleeve, and the HS leads to auxiliary line circuits 132 or 132' in neighboring shelves. The leads 136–139 extend through normally closed contacts SW–1, SW–2, SW–3, and SW–4 to the preferred neighboring shelf, and through normally open contacts SW–5, SW–6, SW–7, and SW–8 of the switching relay SW to the second choice shelf.

So long as there is an idle direct linefinder 124 or 124' in the preferred neighboring shelf, the relay SW remains de-energized, and the output of the auxiliary linefinder to which the circuit is connected is directed to the preferred shelf. When the auxiliary linefinder finds a calling line, the line relay LR connected across a pair of normally open contacts CO–1 in the tip lead 136 picks up, closing its contact LR–1, thereby grounding the sleeve lead 138 of the auxiliary linefinder to mark it busy, and extending the pre-seizure loop to the linefinders 124 or 124' of the neighboring shelf. The allotter 134 or 134' on the neighboring shelf responds by directing one of its direct linefinders 124 or 124' to find the auxiliary line circuit. When this is done, the direct linefinder 124 or 124' grounds the sleeve lead 138 connected to it thus completing the energizing circuit for the cut-off relay CO, which then picks up, closing its contacts CO–1 and allowing the line relay LR to drop out.

The switching relay SW is controlled by the finders-busy relay FB shown in FIG. 3, which also is connected to mark the auxiliary linefinders 130 or 130' busy so long as any one or more of the direct linefinders 124 or 124' are available on the respective shelves. There is one finders-busy relay FB on each shelf. It is connected to be controlled by one contact ATB–1 of the all-trunks-busy relay on its own shelf and to be held picked up so long as one of the direct linefinders 124 or 124' is idle and available. It drops out when all of the direct linefinders on its own shelf are busy. While it is held picked up, the finders-busy relay FB holds its contacts FB–1, FB–2, FB–3, and FB–4 closed, grounding the guard leads (not shown in the other figures) of all of the auxiliary linefinders 130 or 130' on its own shelf to mark them busy so they will not be selected by the allotter 134 or 134'. When it drops out, the finders-busy relay FB closes its contact FB–7 to ground the all finders busy lead AFB leading to the allotter 134 or 134' to mark the direct linefinders 124 or 124' busy at the allotter. At this time, the contacts FB–1—FB–4 open, making the auxiliary linefinders 130 or 130' available to the allotter.

When the relay FB drops out, its eighth contact FB–8 also closes to ground the FNA (finders not available) lead, which is connected to one or the other of the FNA–1 and FNA–2 leads on all other shelves (two in the illustrative embodiment) that have auxiliary linefinders connected to the shelf of which the particular finders-busy relay FB is a part.

Referring now again to FIG. 2, when a finders-busy relay FB on the preferred neighboring shelf drops out, the switching relay SW becomes energized and picks up to switch the outputs of the auxiliary linefinders from the preferred to the second choice shelf. If the finders-busy relay FB of both the preferred and the second choice shelves are dropped out at the same time, both of the leads FNA–1 and FNA–2 are grounded, the switching relay SW is picked up, and the sleeve leads 138 of the auxiliary linefinders on the particular shelf are grounded to mark them busy.

There is one circuit of the type shown in FIG. 2 connected to each of the auxiliary linefinders 130 and 130'. There is one finders-busy relay FB for each linefinder shelf.

In accordance with a modified form of the invention, a significant degree of circuit simplification may be achieved at the cost of only relatively little sacrifice in traffic handling efficiency by connecting the output of each of the auxiliary linefinders 130 or 130' to only one of the neighboring shelves in the cooperative division. In this case, the circuit shown in FIG. 4 may be used as the auxiliary line circuit in place of the one shown in FIGS. 2 and 3.

In the auxiliary line circuit shown in FIG. 4, the tip lead 142 is normally grounded through the normally closed contacts CO'–1 of the cut-off relay CO'. When the auxiliary linefinder 130 or 130' finds the calling line, it completes the line loop through the ring lead 144 and tip lead 142, thereby causing the line relay LR' to pick up. The contact LR'–1 then closes, grounding the sleeve lead 146 of the auxiliary linefinder, and its contact LR'–3 closes to mark the sleeve lead 147 of the neighboring shelf by connecting it to the negative battery terminal through the cut-off relay CO'. Simultaneously, the AST lead of the allotter on the neighboring shelf is grounded by closing of the contact LR'–4, upon which the allotter instructs an available direct linefinder on the neighboring shelf to hunt for the marked auxiliary line circuit.

When the direct linefinder finds the marked auxiliary line circuit, it grounds the sleeve lead 147, thereby completing the energizing circuit for the cut-off relay CO', which is thereafter held up through its self-holding contacts CO'–2. The contacts CO'–3 open to release the line relay LR', and the contacts CO'–4 also open to remove the ground signal from the AST lead.

If all of the direct line finders of the neighboring shelf are busy, the sleeve lead 147 is grounded by the conventional all-finders-busy relay, thereby making the sleeve lead 146 of the auxiliary linefinder busy.

Thus, the application of the principles of alternate routing as applied to linefinders enables a substantial reduction in the number of stepping switches required in a step-by-step switching exchange by enabling the averaging of traffic requirements over a larger base than heretofore available in exchanges of this type, because each linefinder shelf is given access to all of the first selectors in its cooperative division.

What is claimed is:

1. A cooperative linefinder arrangement for use in a telephone exchange or the like of the step-by-step type comprising:

(a) plural linefinder shelves, each of said shelves having inputs connected to a separate respective group of subscriber's lines, and having plural stepping switches, (b) the outputs of selected ones of said stepping switches of each shelf being connected to selectors in the exchange, (c) the outputs of other selected ones of said stepping switches on each shelf being connected to inputs of selected ones of said stepping switches on neighboring shelves, and (d) control means for controlling and operating said stepping switches in accordance with a predetermined priority system and responsively to signals received over the subscriber's lines.

2. A cooperative linefinder arrangement in accordance with claim 1, wherein the outputs of said other selected ones of said stepping switches are each connected selectively and alternately to inputs of said stepping switches on each of two neighboring shelves.

3. A switching arrangement for a telephone exchange of the step-by-step type to connect input terminals selectively to respective different output terminals comprising:

(a) a plurality of input terminals arranged in groups numbering more than two, (b) a plurality of output terminals, (c) a plurality of stepping switches for selectively connecting said input terminals to said output terminals, said stepping switches being arranged in groups corresponding to the groups of said input terminals, the inputs of each of said stepping switches being associated with and limited to the input terminals in its corresponding group of said input terminals, (d) the outputs of selected ones of said stepping switches in each group being connected respectively to respective ones of said input terminals in all other groups, and (e) control means for controlling and operating said stepping switches responsively to signals received at said input terminals.

References Cited

UNITED STATES PATENTS 1,271,855 7/1918 Clausen.

KATHLEEN H. CLAFFY, Primary Examiner

R. P. MYERS, Assistant Examiner